United States Patent
Wang et al.

(10) Patent No.: US 7,369,937 B1
(45) Date of Patent: May 6, 2008

(54) INTAKE AIR TEMPERATURE RATIONALITY DIAGNOSTIC

(75) Inventors: Wenbo Wang, Novi, MI (US); Kurt D. McLain, Clarkston, MI (US); Zhong Wang, Westland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/821,590

(22) Filed: Jun. 22, 2007

(51) Int. Cl.
*F02D 45/00* (2006.01)
*G06F 19/00* (2006.01)

(52) U.S. Cl. .................................. 701/114; 73/118.1
(58) Field of Classification Search ............... 701/114, 701/101, 102; 73/118.1, 118.2
See application file for complete search history.

(56) References Cited

U.S. PATENT DOCUMENTS 5,388,454 A * 2/1995 Kuroda et al. ............. 73/118.1
5,669,347 A * 9/1997 Cullen et al. ............... 123/306
7,027,905 B1 * 4/2006 Mladenovic et al. ........ 701/702

FOREIGN PATENT DOCUMENTS

JP 2003-83150 A * 3/2003

OTHER PUBLICATIONS

U.S. Appl. No. 11/464,340, filed Aug. 14, 2006, Wenbo Wang et al.
Patent Application by Kurt D. McLain et al., "Intake Air Temperature Rationality Diagnostic", filed Jun. 22, 2007, Reference No. P000543-PTE-CD, 21 pages.

* cited by examiner

Primary Examiner—Hieu T. Vo

(57) ABSTRACT

A method of determining whether a fault condition of an intake air temperature (IAT) sensor of an engine is present includes estimating a first intake charge temperature (ICT) based on an estimated first ICT and a previously estimated first mass air flow (MAF) and estimating a second ICT based on a previously estimated second ICT and a currently measured MAF. An IAT difference is determined based on the first ICT and the second ICT. Whether the fault condition of the IAT sensor is present is determined based on the IAT difference.

21 Claims, 3 Drawing Sheets

INTAKE AIR TEMPERATURE RATIONALITY DIAGNOSTIC

FIELD

The present disclosure relates to internal combustion engines, and more particularly to an intake air temperature sensor rationality diagnostic.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the air and fuel mixture is compressed within a cylinder using a piston. The air and fuel mixture is combusted within the cylinder to reciprocally drive the piston within the cylinder, which in turn rotationally drives a crankshaft of the engine.

Engine operation is regulated based on several parameters including, but not limited to, intake air temperature (IAT), manifold absolute pressure (MAP), throttle position (TPS), engine RPM and barometric pressure ($P_{BARO}$). With specific reference to the throttle, the state parameters (e.g., air temperature and pressure) before the throttle are good references that can be used for engine control and diagnostic. Traditional internal combustion engines include an IAT sensor that directly measures the IAT. In some instances, however, the IAT sensor can become inaccurate as a result of damage, wear and/or a number of other factors. Accordingly, the IAT sensor should be monitored to determine whether the IAT that is determined based on the IAT sensor reading is rational.

Some traditional internal combustion engine systems include a second IAT sensor, the reading from which is compared to that of the first IAT sensor in order to determine whether the first IAT sensor is rational. This additional IAT sensor increases cost and complexity and itself must be monitored for accuracy.

SUMMARY

Accordingly, the present invention provides a method of determining whether a fault condition of an intake air temperature (IAT) sensor of an engine is present. The method includes estimating a first intake charge temperature (ICT) based on a previously estimated first ICT and an estimated first mass air flow (MAF) and estimating a second ICT based on a previously estimated second ICT and a currently measured MAF. An IAT difference is determined based on the first ICT and the second ICT. Whether the fault condition of the IAT sensor is present is determined based on the IAT difference.

In another feature, the method further includes calculating an ICT difference based on the first ICT and the second ICT, wherein the IAT difference is determined based on the ICT difference.

In another feature, the step of determining whether the fault condition is present includes comparing the IAT difference to a threshold IAT difference and indicating an IAT fault when the IAT difference is greater than the threshold IAT difference.

In another feature, the method further includes estimating the first MAF based on at least one of a throttle inlet pressure, an effective flow area through the throttle, measured MAP, measured IAT and a previously estimated MAF.

In another feature, the first ICT is estimated based on an estimated first engine flow rate (EFR) from an intake manifold of the engine.

In still another feature, the second ICT is estimated based on an estimated second engine flow rate (EFR) from an intake manifold of the engine.

In yet another feature, the first and second ICTs are estimated based on respective first and second exhaust gas recirculation (EGR) values.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
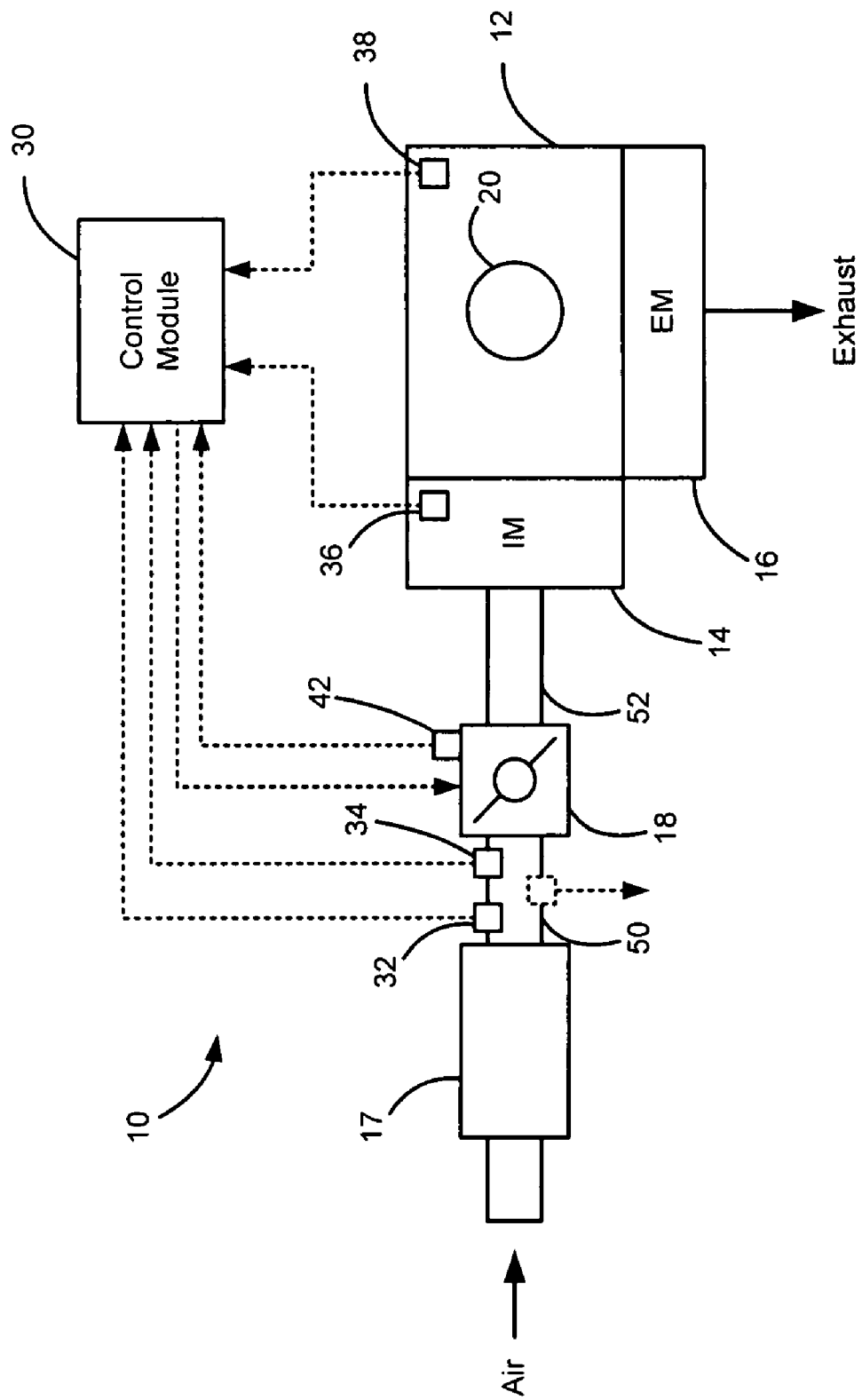
FIG. 1 is a functional block diagram of an internal combustion engine system that is regulated in accordance with the intake air temperature (IAT) rationality control of the present disclosure.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary internal combustion engine system 10 is illustrated. The engine system 10 includes an engine 12, an intake manifold 14 and an exhaust manifold 16. Air is drawn into the intake manifold 14 through an air filter 17 and a throttle 18. The air is mixed with fuel, and the fuel and air mixture is combusted within a cylinder 20 of the engine 12. More specifically, the fuel and air mixture is compressed within the cylinder 20 by a piston (not shown) and combustion is initiated. The combustion process releases energy that is used to reciprocally drive the piston within the cylinder 20. Exhaust that is generated by the combustion process is exhausted through the exhaust manifold 16 and is treated in an exhaust aftertreatment system (not shown) before being released to atmosphere. Although a single cylinder 20 is illustrated, it is anticipated that the intake air rationality control of the present invention can be implemented with engines having more than one cylinder.

A control module 30 regulates engine operation based on a plurality of engine operating parameters including, but not limited to, a pre-throttle static pressure ($P_{PRE}$), a pre-throttle stagnation pressure ($P_{PRE0}$) (i.e., the air pressures upstream of the throttle), an intake air temperature (IAT), a mass air flow (MAF), a manifold absolute pressure (MAP), an effective throttle area ($A_{EFF}$), an engine RPM and a barometric pressure ($P_{BARO}$). $P_{PRE0}$ and $P_{PRE}$ are determined based on a pre-throttle estimation control, which is disclosed in commonly assigned, co-pending U.S. patent application Ser. No. 11/464,340, Aug. 14, 2006.

IAT, MAF, MAP and engine RPM are determined based on signals generated by an IAT sensor 32, a MAF sensor 34, a MAP sensor 36 and an engine RPM sensor 38, respectively, which are all standard sensors of an engine system. $A_{EFF}$ is determined based on a throttle position signal that is generated by a throttle position sensor, which is also a standard sensor. A throttle position sensor 42 generates a throttle position signal (TPS). The relationship between $A_{EFF}$ to TPS is pre-determined using engine dynamometer testing with a temporary stagnation pressure sensor 50 (shown in phantom in FIG. 1) installed. Production vehicles include the relationship pre-programmed therein and therefore do not require the presence of the stagnation pressure sensor.

The IAT rationality control of the present disclosure monitors the accuracy of the IAT sensor 32. More specifically, a first estimated intake charge temperature (ICT) value (IĈT1) and a second estimated ICT value (IĈT2) are determined and the accuracy of the IAT sensor 32 is monitored based on a difference between IĈT1 and IĈT2 (ΔIĈT). More specifically, ΔIĈT corresponds to a difference between the ΔIAT sensed by the IAT sensor 32 and the actual IAT (ΔIAT). For example, the greater the ΔIĈT in the positive or negative directions, the greater ΔIAT is. As a note, the "^" character indicates an estimated (i.e., not directly measured) value.

IĈT1 is determined based on the following relationship:

$$I\hat{C}T1_t = I\hat{C}T1_{t-1} + \left[\frac{\Delta MAP_t}{MAP_t} \cdot I\hat{C}T1_{t-1} - \frac{\Delta t \cdot R \cdot (M\hat{A}F1_t + E\hat{G}R_t - E\hat{F}R1_t)}{MAP_t \cdot V_{INT}} \cdot I\hat{C}T1_{t-1}^2\right] \quad (1)$$

where:
t is the current time step;
t−1 is the previous time step;
Δt is the difference between t and t−1;
R is the gas constant for air (287 m²/(s²·° K);
MÂF1 is the estimated MAF;
EĜR1 is the estimated exhaust gas recirculation into the intake manifold (in the case that an EGR system is present);
EF̂R1 is the gas flow out of the intake manifold (i.e., into the cylinders); and
$V_{INT}$ is the intake manifold volume (constant).

MÂF1$_t$ is determined in accordance with the following relationship:

$$M\hat{A}F1_t = \frac{MAF_{LAG} \cdot P_{INLET} \cdot \varphi \cdot A_{EFF}}{\sqrt{R \cdot (IAT_t)}} + (1 - MAF_{LAG}) \cdot M\hat{A}F_{t-1} \quad (2)$$

where:
$P_{INLET}$ is the absolute pressure at the throttle inlet;
$A_{EFF}$ is the effective flow area through the throttle and is determined based on the throttle position (TPS); and $MAF_{LAG}$ is a first order lag filter value that ranges between 0 and 1 with a resolution of 0.1.

φ is determined based on a pressure ratio ($P_R$) across the throttle. $P_R$ is provided as:

$$P_R = \frac{MAP_t}{P_{INLET}} \quad (3)$$

If $P_R$ not greater than 0.5283, the flow through the throttle is limited or choked and φ is constant and equal to 0.685. If $P_R$ is greater than 0.5283 and is less than 1, φ is determined based on the following relationship:

$$\varphi = \sqrt{7 \cdot (P_R^{1.428} - P_R^{1.714})} \quad (4)$$

EF̂R1 is determined based on the following relationship:

$$E\hat{F}R1_t = \frac{RPM \cdot MAP_t \cdot B_{CORR} \cdot N \cdot V_{DISP} \cdot V_{EFF}}{120 \cdot R \cdot I\hat{C}T1_{t-1}} \quad (5)$$

where:
$B_{CORR}$ is a correction factor that is determined based on $P_{BARO}$ and RPM;
$V_{EFF}$ is the volumetric efficiency of the engine and is determined based on RPM and MAP$_t$;
N is the number of cylinders in the engine; and
$V_{DISP}$ is the engine displacement.

IĈT2 is determined based on the following relationship:

$$I\hat{C}T2_t = I\hat{C}T2_{t-1} + \left[\frac{\Delta MAP_t}{MAP_t} \cdot I\hat{C}T2_{t-1} - \frac{\Delta t \cdot R \cdot (M\hat{A}F2_t + E\hat{G}R_t - E\hat{F}R2_t)}{MAP_t \cdot V_{INT}} \cdot I\hat{C}T2_{t-1}^2\right] \quad (6)$$

where MÂF2$_t$ is set equal to the currently measured MAF (MAF$_t$). Accordingly, Equation 6 parallels Equation 1 except for the fact that MAF$_t$ is implemented instead of actually estimating MÂF2. Furthermore, EF̂R2 is determined based on the following relationship:

$$E\hat{F}R2_t = \frac{(RPM \cdot MAP_t \cdot B_{CORR} \cdot N \cdot V_{DISP} \cdot V_{EFF})}{120 \cdot R \cdot I\hat{C}T2_{t-1}} \quad (7)$$

Accordingly, Equation 7 parallels Equation 5 above.

Figure 2:
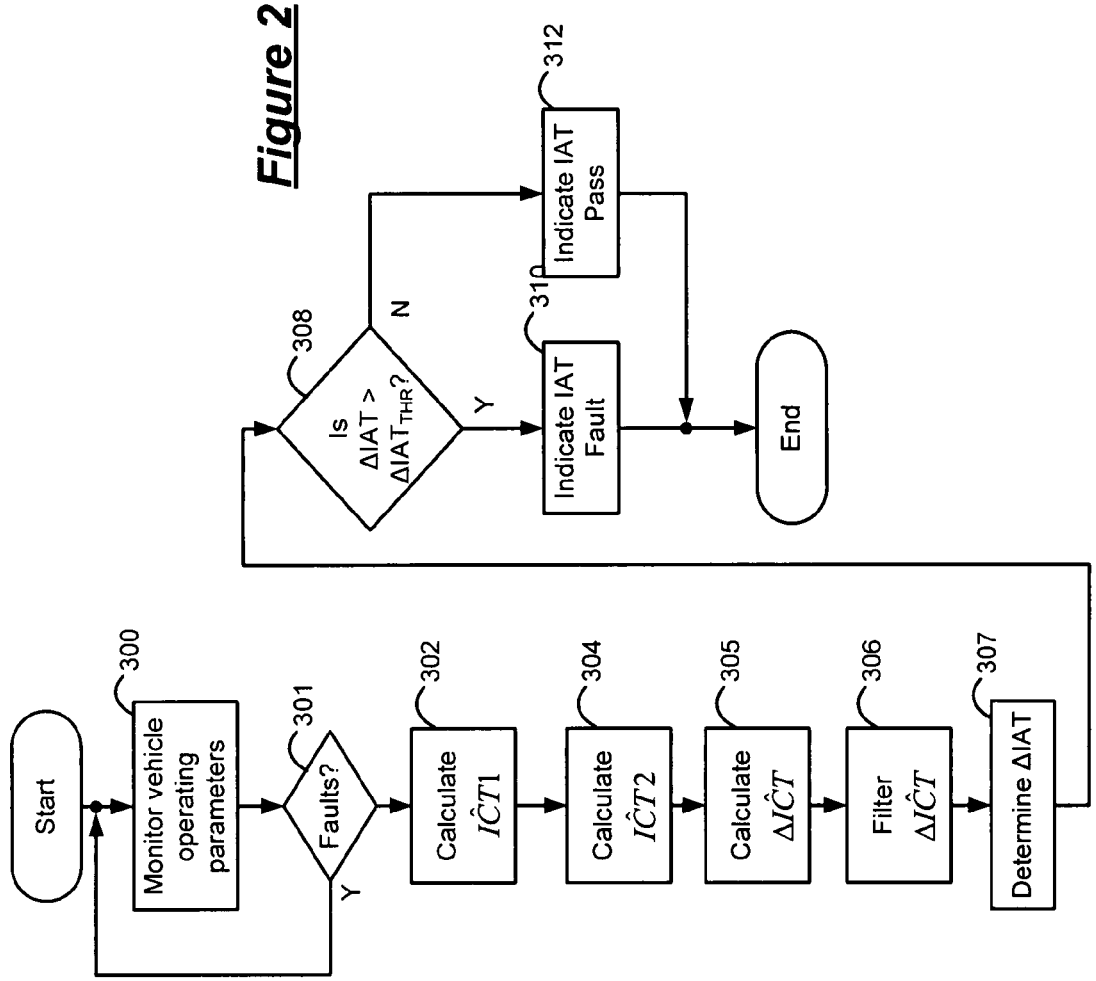
FIG. 2 is a flowchart illustrating exemplary steps that are executed by the IAT rationality control of the present disclosure.

Referring now to FIG. 2, exemplary steps that are executed by the IAT rationality control will be described in detail. In step 300, control monitors the vehicle operating parameters. In step 301, control determines whether any applicable active diagnostic faults are detected. The applicable active faults are those that will prevent diagnostic system from making a correct or robust detection. The applicable active faults may include, but are not limited to, a MAF sensor fault, a TPS fault and a MAP sensor fault. It is understood that other fault signals may be considered. If any active diagnostic faults are detected, control loops back to step 301. In step 302, control calculates IĈT1 based on the operating parameters. In step 304, control calculates IĈT2 based on the operating parameters. Control calculates $\Delta\hat{ICT}$ in step 305, and filters $\Delta\hat{ICT}$ in step 306. Control determines $\Delta IAT$ in step 307 based on the filtered $\Delta\hat{ICT}$. In step 308, control determines whether $\Delta IAT$ is greater than $\Delta IAT_{THR}$. If $\Delta IAT$ is greater than $\Delta IAT_{THR}$, control continues in step 310. If $\Delta IAT$ is not greater than $\Delta IAT_{THR}$, control continues in step 312. In step 310, control indicates a fault with the IAT sensor. In step 312, control indicates a pass with the IAT sensor and control ends.

Figure 3:
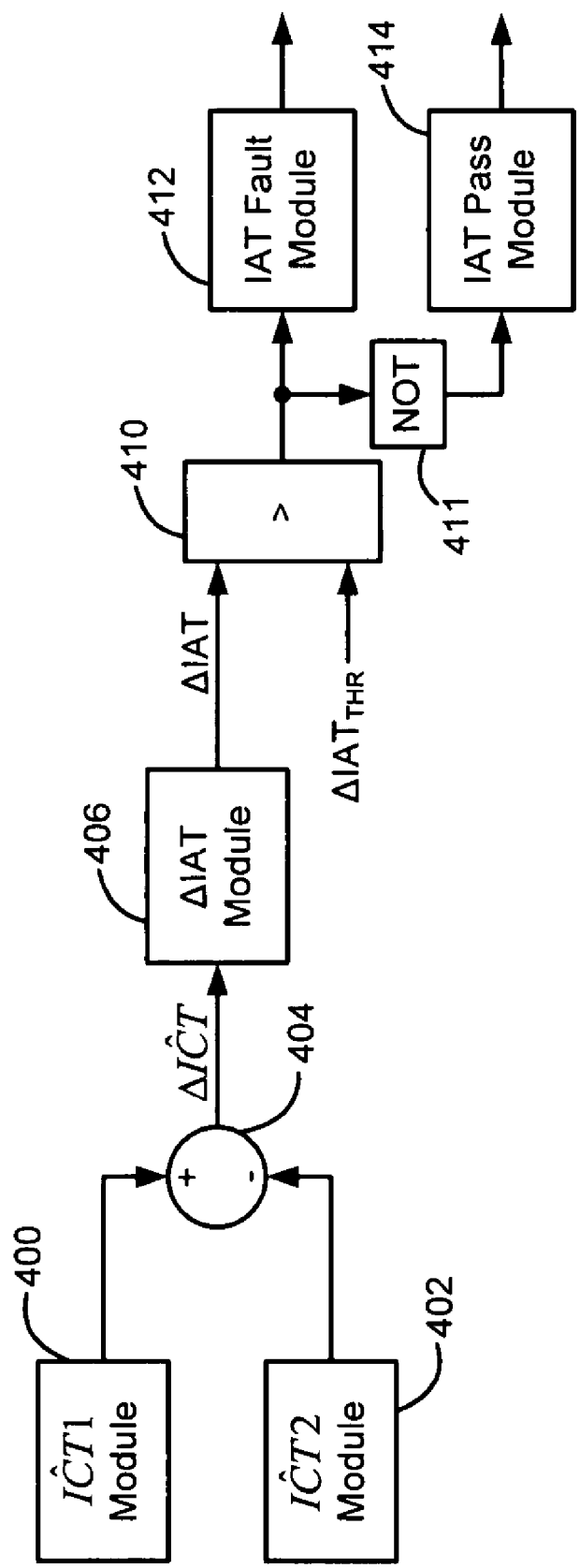
FIG. 3 is a functional block diagram illustrating exemplary modules that execute the IAT rationality control.

Referring now to FIG. 3, exemplary modules that execute the IAT control will be described in detail. The exemplary modules include a $\hat{MAP}1$ module 400, a $\hat{MAP}2$ module 402, a difference module 404, a $\Delta IAT$ module 406, a comparator module 410, a NOT module 411, an IAT fault module 412 and an IAT pass module 414. The $\hat{ICT}1$ module 400 and the $\hat{ICT}2$ module 402 determine $\hat{ICT}1$ and $\hat{ICT}2$, respectively, based on the engine operating parameters, as described in detail above. The difference module 404 determines $\Delta\hat{ICT}$ based on $\hat{ICT}1$ and $\hat{ICT}2$.

The $\Delta IAT$ module 406 determines $\Delta IAT$ based on filtered $\Delta\hat{ICT}$. In one embodiment, the $\Delta IAT$ module 406 can process $\Delta\hat{ICT}$ using a derived formula to calculate $\Delta IAT$. In an alternative embodiment, the $\Delta IAT$ module 406 includes a pre-programmed look-up table and determines $\Delta IAT$ from the look-up table using $\Delta\hat{ICT}$ as an input.

The comparator module 410 compares $\Delta IAT$ to $\Delta IAT_{THR}$ and generates a signal based thereon, which is output to the IAT fault module 412. For example, if $\Delta IAT$ is greater than $\Delta IAT_{THR}$, the comparator module 410 generates a signal equal to "1", for example, and the IAT fault module 412 indicates an IAT fault. If $\Delta IAT$ is not greater than $\Delta IAT_{THR}$, the comparator module 410 generates a signal equal to "0", for example, and the IAT fault module 412 does not indicate an IAT fault. The NOT module 411 inverts the signal that is output from the comparator module 410. The IAT pass module 414 indicates an IAT pass based on the output of the NOT module 411.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system for determining whether a fault condition of an intake air temperature (IAT) sensor of an engine is present, comprising:
a first module that estimates a first intake charge temperature (ICT) based on a previously estimated first ICT and an estimated first mass air flow (MAF);
a second module that estimates a second ICT based on a previously estimated second ICT and a currently measured MAF;
a third module that determines an IAT difference based on said first ICT and said second ICT; and
a fourth module that determines whether the fault condition of the IAT sensor is present based on said IAT difference.

2. The system of claim 1 further comprising a fifth module that calculates an ICT difference based on said first ICT and said second ICT, wherein said IAT difference is determined based on said ICT difference.

3. The system of claim 1 wherein said fourth module determines whether the fault condition is present by:
comparing said IAT difference to a threshold IAT difference; and
indicating an IAT fault when said IAT difference is greater than said threshold IAT difference.

4. The system of claim 1 further comprising a fifth module that estimates said first MAF based on at least one of a throttle inlet pressure, an effective flow area through the throttle, a measured MAP, a measured IAT and a previously estimated MAF.

5. The system of claim 1 wherein said first ICT is estimated based on an estimated first engine flow rate (EFR) from an intake manifold of an engine.

6. The system of claim 1 wherein said second ICT is estimated based on an estimated second engine flow rate (EFR) from an intake manifold of an engine.

7. The system of claim 1 wherein said first and second ICTs are estimated based on respective first and second exhaust gas recirculation (EGR) values.

8. A method of determining whether a fault condition of an intake air temperature (IAT) sensor of an engine is present, comprising:
estimating a first intake charge temperature (ICT) based on a previously estimated first ICT and an estimated first mass air flow (MAF);
estimating a second ICT based on a previously estimated second ICT and a currently measured MAF;
determining an IAT difference based on said first ICT and said second ICT; and
determining whether the fault condition of the IAT sensor is present based on said IAT difference.

9. The method of claim 8 further comprising calculating an ICT difference based on said first ICT and said second ICT, wherein said IAT difference is determined based on said ICT difference.

10. The method of claim 8 wherein the step of determining whether the fault condition is present comprises:
comparing said IAT difference to a threshold IAT difference; and
indicating an IAT fault when said IAT difference is greater than said threshold IAT difference.

11. The method of claim 8 further comprising estimating said first MAF based on at least one of a throttle inlet pressure, an effective flow area through the throttle, a measured MAP, a measured IAT and a previously estimated MAF.

12. The method of claim 8 wherein said first ICT is estimated based on an estimated first engine flow rate (EFR) from an intake manifold of the engine.

13. The method of claim 8 wherein said second ICT is estimated based on an estimated second engine flow rate (EFR) from an intake manifold of the engine.

14. The method of claim 8 wherein said first and second ICTs are estimated based on respective first and second exhaust gas recirculation (EGR) values.

15. A method of operating an engine using an intake air temperature (IAT) sensor, comprising:
estimating a first intake charge temperature (ICT) based on a previously estimated first MAP and an estimated first mass air flow (MAF);
estimating a second ICT based on a previously estimated second ICT and a currently measured MAF;
determining an IAT difference based on said first ICT and said second ICT;

determining a corrected IAT value based on said IAT difference; and operating the engine based on said corrected IAT value.

16. The method of claim 15 further comprising calculating an ICT difference based on said first ICT and said second ICT, wherein said IAT difference is determined based on said ICT difference.

17. The method of claim 15 further comprising:

comparing said IAT difference to a threshold IAT difference; and indicating an IAT fault when said IAT difference is greater than said threshold IAT difference.

18. The method of claim 15 further comprising estimating said first MAF based on at least one of a throttle inlet pressure, an effective flow area through the throttle, a measured MAP, a measured IAT and a previously estimated MAF.

19. The method of claim 15 wherein said first ICT is estimated based on an estimated first engine flow rate (EFR) from an intake manifold of the engine.

20. The method of claim 15 wherein said second ICT is estimated based on an estimated second engine flow rate (EFR) from an intake manifold of the engine.

21. The method of claim 15 wherein said first and second ICTs are estimated based on respective first and second exhaust gas recirculation (EGR) values.

* * * * *